US011913266B2

(12) United States Patent
Dhamdhere et al.

(10) Patent No.: US 11,913,266 B2
(45) Date of Patent: Feb. 27, 2024

(54) DOOR ASSEMBLY FOR A HOUSEHOLD APPLIANCE

(71) Applicant: WHIRLPOOL CORPORATION, Benton Harbor, MI (US)

(72) Inventors: Ajinkya Sachindra Dhamdhere, Pune (IN); Ratul Maity, Howrah (IN); Andrea Valeri, Fabriano (IT)

(73) Assignee: Whirlpool Corporation, Benton Harbor, MI (US)

( * ) Notice: Subject to any disclaimer, the term of this patent is extended or adjusted under 35 U.S.C. 154(b) by 294 days.

(21) Appl. No.: 17/511,825

(22) Filed: Oct. 27, 2021

(65) Prior Publication Data

US 2023/0129004 A1 Apr. 27, 2023

(51) Int. Cl.

| | |
|---|---|
| ***E05C 3/12*** | (2006.01) |
| ***D06F 37/42*** | (2006.01) |
| ***D06F 39/14*** | (2006.01) |
| ***E05B 65/00*** | (2006.01) |

(52) U.S. Cl.
CPC ................ *E05C 3/12* (2013.01); *D06F 37/42* (2013.01); *D06F 39/14* (2013.01); *E05B 65/00* (2013.01)

(58) Field of Classification Search
CPC ... E05C 3/12; E05C 3/24; E05C 19/02; D06F 37/42; D06F 39/14; E05B 65/00
See application file for complete search history.

(56) References Cited

U.S. PATENT DOCUMENTS

| | | | | |
|---|---|---|---|---|
| 3,520,568 | A * | 7/1970 | White | E05B 53/001 292/255 |
| 3,803,575 | A * | 4/1974 | Gotanda | G08B 13/08 340/542 |
| 3,924,085 | A * | 12/1975 | Stone | D06F 37/42 200/61.81 |
| 4,529,852 | A * | 7/1985 | Lewandowski | H01H 3/163 200/51.09 |
| 5,174,618 | A * | 12/1992 | Kropf | E05C 3/16 292/254 |
| 7,985,934 | B2 * | 7/2011 | Schuck | D06F 37/42 200/61.68 |
| 9,410,349 | B2 | 8/2016 | Hapke et al. | |
| 9,580,952 | B2 | 2/2017 | Da Pont et al. | |
| 10,612,274 | B2 | 4/2020 | Kuehn et al. | |
| 10,844,635 | B2 | 11/2020 | Olson | |
| 2009/0260198 | A1 * | 10/2009 | Morgan | E05C 19/063 24/458 |
| 2013/0232810 | A1 * | 9/2013 | Coxon | F26B 11/02 34/108 |
| 2016/0230330 | A1 * | 8/2016 | Lee | E05B 9/08 |
| 2018/0363226 | A1 * | 12/2018 | Gim | D06F 33/30 |

(Continued)

FOREIGN PATENT DOCUMENTS

| | | | | |
|---|---|---|---|---|
| EP | 2766519 B1 | | 2/2016 | |
| FR | 2930953 A1 | * | 11/2009 | D06F 37/10 |

(Continued)

*Primary Examiner* — Hanh V Tran
(74) *Attorney, Agent, or Firm* — McGarry Bair PC

(57) ABSTRACT

A door assembly for an appliance includes a door frame configured to mount to a cabinet of the appliance and movable between an open position and a closed position. A catch mechanism can be provided within the door frame and configured to receive a latch projecting from the cabinet when the door frame is in the closed position.

20 Claims, 6 Drawing Sheets

(56) References Cited

U.S. PATENT DOCUMENTS

| | | | | |
|---|---|---|---|---|
| 2018/0371800 | A1* | 12/2018 | McDonald | E05B 47/0046 |
| 2019/0301230 | A1* | 10/2019 | Spiessl | E05F 15/619 |
| 2019/0338999 | A1* | 11/2019 | Lee | E05C 1/12 |
| 2020/0115923 | A1* | 4/2020 | DeYoung | E05B 17/22 |
| 2021/0047770 | A1* | 2/2021 | Attar | D06F 37/28 |
| 2021/0285148 | A1* | 9/2021 | Jang | D06F 23/02 |
| 2021/0348434 | A1* | 11/2021 | Walz | D06F 39/14 |

FOREIGN PATENT DOCUMENTS

| | | | | |
|---|---|---|---|---|
| GB | 2397095 | A1 | 7/2004 | |
| KR | 20160140628 | A * | 12/2016 | |
| WO | WO-2005003494 | A1 * | 1/2005 | E05B 15/102 |
| WO | WO-2008123666 | A1 * | 10/2008 | D06F 37/42 |

* cited by examiner

DOOR ASSEMBLY FOR A HOUSEHOLD APPLIANCE

BACKGROUND

Household appliances, such as clothes washers, clothes dryers, refreshers, non-aqueous systems, dishwashers, refrigerators, or freezers, or the like, can have a configuration based on a cabinet housing one or more articles and a door assembly movably mounted to the cabinet. Such door assemblies can include mechanisms for retaining, locking, or otherwise securing the door assembly in a closed position.

BRIEF SUMMARY

In one aspect, the disclosure relates to a door assembly for an appliance. The door assembly includes a door frame configured to mount to a cabinet of the appliance and movable between an open position and a closed position, a catch mechanism within the door frame and configured to receive a latch projecting from the cabinet when the door frame is in the closed position, and a unitary body coupled to the door frame and comprising a lock projection projecting from the unitary body and an aperture overlying the catch mechanism.

In another aspect, the disclosure relates to a household appliance. The household appliance includes a cabinet defining an interior, a tub located within the interior and at least partially defining a treating chamber for receiving an article for treatment, a latch coupled to the cabinet and projecting therefrom, a locking member coupled to the cabinet, and a door assembly coupled to the cabinet to selectively open and close the treating chamber. The door assembly includes a door frame pivotally mounted to the cabinet and movable between an open position and a closed position, a catch mechanism within the door frame and configured to receive the latch when the door frame is in the closed position, and a unitary body coupled to the door frame and comprising a lock projection projecting from the unitary body and an aperture overlying the catch mechanism, wherein the latch is configured to extend through the aperture of the unitary body and be retained by the catch mechanism when the door frame is in the closed position, and wherein the locking member is configured to retain the lock projection for locking the door assembly when the door frame is in the closed position.

In yet another aspect, the disclosure relates to a household appliance. The household appliance includes a cabinet defining an interior, a latch coupled to the cabinet and projecting therefrom, a locking member coupled to the cabinet, and a door assembly coupled to the cabinet to selectively provide access to the interior. The door assembly includes a door frame pivotally mounted to the cabinet and movable between an open position and a closed position, a catch mechanism within the door frame and configured to receive the latch when the door frame is in the closed position, and a unitary body coupled to the door frame and comprising a lock projection projecting from the unitary body and an aperture overlying the catch mechanism, wherein the latch is configured to extend through the aperture of the unitary body and be retained by the catch mechanism when the door frame is in the closed position, and wherein the locking member is configured to retain the lock projection for locking the door assembly when the door frame is in the closed position.

DETAILED DESCRIPTION

Figure 1:
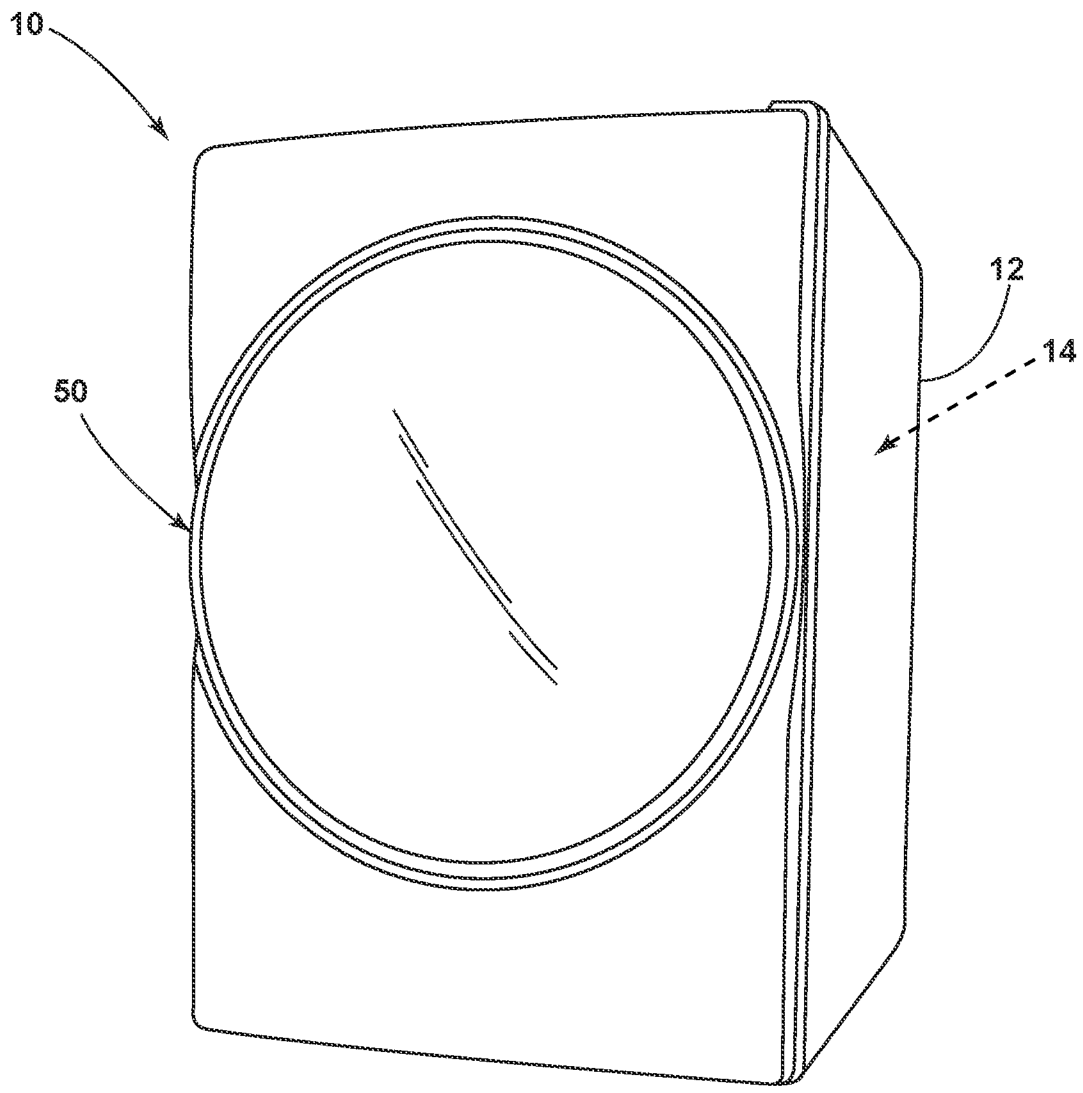
FIG. 1 illustrates a perspective view of an exemplary household appliance having a door assembly in accordance with various aspects described herein.

Aspects of the disclosure relate to a door assembly for a household appliance. Door assemblies for household appliances can include a variety of features and components, including a transparent viewing window area, structures for preventing the passage of liquid through the door assembly, a closure mechanism, or a locking mechanism, in non-limiting examples. Door assemblies can traditionally include a closure mechanism for releasably retaining the door assembly in a closed position, such as a latch and catch mechanism, a magnetic catch mechanism, a spring-biased hinge, or the like. Traditional appliance door assemblies can also include a separate locking mechanism for preventing opening of the door, such as during a cycle of operation of the appliance. For doors having both a releasable closure and a locking mechanism, assembly of such doors can require additional time or part complexity as the two mechanisms generally require particular alignment configurations and hardware installations with respect to the cabinet as well as within the door itself.

The described aspects of the present disclosure have applicability in a variety of household appliances including, but not limited to, laundry treating appliances, dishwashers, refrigerators, freezers, or the like. Some non-limiting examples of laundry treating appliances include laundry washing appliances, laundry drying appliances, combination laundry washer/dryers, refreshing/revitalizing machines, extractors, non-aqueous washing apparatuses, or the like. In some examples, laundry treating appliances can be front-loading or top-loading. In some examples, laundry treating appliances can be in a horizontal-axis or a vertical-axis arrangement. Aspects of the disclosure can have applicability to any appliance having a door, whether it be hingedly connected to a cabinet, slidable in or out of a cabinet, or combinations thereof.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, or joined) are to be construed broadly and can include intermediate members between a collection of elements and relative movement between elements unless otherwise indicated. As such, connection references do not necessarily infer that two elements are directly connected and in fixed relation to one another. Furthermore, as used herein, the term "set" or a "set" of elements can be any number of elements, including only one. The exemplary drawings are for purposes of illustration only and the dimensions, positions, order and relative sizes reflected in the drawings attached hereto can vary.

Turning to FIG. 1, one exemplary household appliance 10 is illustrated. The exemplary household appliance 10 is illustrated herein as a laundry treating appliance, such as a washing machine or a laundry dryer, though this need not be the case. In some examples, the household appliance 10 can be any laundry treating appliance that performs a cycle of operation to clean or otherwise treat laundry items placed therein. The household appliance 10 shares many features of a conventional automated clothes washer and/or dryer, which will not be described in detail herein except as necessary for a complete understanding of the exemplary embodiments in accordance with the present disclosure.

The household appliance 10 can include a structural support assembly comprising a cabinet 12 defining an interior 14. In the illustrated example, the cabinet 12 can form a housing within which a laundry holding assembly resides. The cabinet 12 can include a chassis or frame defining the interior 14. In some example, the cabinet 12 can enclose components typically found in a conventional washing machine or drying machine. A door assembly 50 can be coupled to the cabinet 12. The door assembly 50 can be movably mounted to the cabinet 12 to selectively provide access to the interior 14. Conventional washing machine or drying machine components are not described in detail, but are described briefly herein as needed to provide an illustrative environment to support a complete understanding of aspects of the present disclosure.

Figure 2:
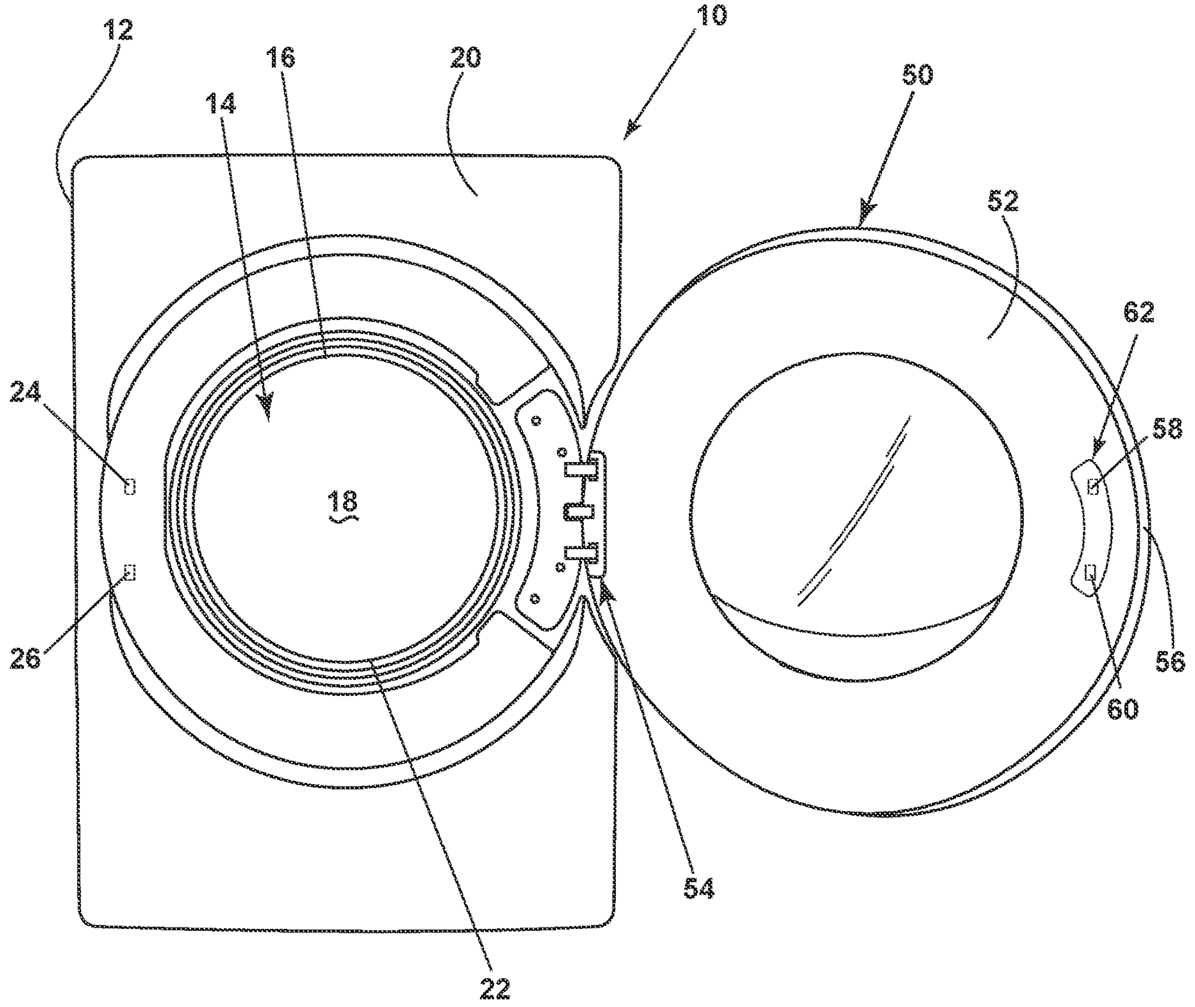
FIG. 2 illustrates a front view of the household appliance of FIG. 1 with the door assembly in an open condition.

Referring now to FIG. 2, the laundry holding assembly may include a rotatable drum 16 supported within the cabinet 12 by a suitable suspension assembly. The drum 16 can rotate about a rotational axis which is shown as a generally horizontal axis, though this need not be the case. The drum 16 can at least partially define a treating chamber 18 for receiving an article for treatment, non-limiting examples of which include a hat, a scarf, a glove, a sweater, a blouse, a shirt, a pair of shorts, a dress, a sock, a pair of pants, a shoe, an undergarment, or a jacket. The cabinet 12 can include a front panel 20 with an access opening 22 providing access to the interior 14, such as to the treating chamber 18.

In the example shown, the door assembly 50 can selectively open and close the access opening 22 to the treating chamber 18. In the example shown, the door assembly 50 can include a door frame 52 pivotally mounted to the cabinet. The door frame 52 can be movable between an open position (shown in FIG. 2) and a closed position (shown in FIG. 1). The door frame 52 can be pivotally opened or closed about a hinge assembly 54. A handle 56 can also be provided for opening and closing of the door assembly 50. In some examples, a transparent viewing window can be provided with the door assembly 50 for viewing portions of the interior 14 when the door assembly 50 is closed.

A catch mechanism 58 can be provided within the door frame 52. A latch 24 can be coupled to the cabinet 12. The latch 24 can project from the cabinet 12. In some examples, the latch 24 can include a striker. When the door frame 52 is in the closed position as in FIG. 1, the catch mechanism 58 can be configured to receive the latch 24, and the latch 24 can be retained by the catch mechanism 58. In some examples, the door assembly 50 can be moved from the closed state to the open state by pulling on the handle 56 with sufficient force to release the latch 24 from the catch mechanism 58. In some examples, the latch 24 can be released from the catch mechanism 58 under an applied force of between 50 N and 100 N, or between 60 N and 70 N. In this manner the door assembly 50 can be releasably retained in a closed position by way of the latch 24 and catch mechanism 58.

In addition, the household appliance 10 can include a mechanism for locking the door assembly. In some examples, a locking member 26 can be coupled to the cabinet 12. The locking member 26 can be located within the cabinet 12. A lock projection 60 can be provided with the door frame 52. The lock projection 60 can project from the door frame 52. When the door frame 52 is in the closed position as in FIG. 1, the locking member 26 can be configured to retain the lock projection 60 for locking the door assembly 50. In this manner, the door assembly 50 can be locked while in the closed position, thereby preventing release of the latch 24 from the catch mechanism 58.

Figure 3:
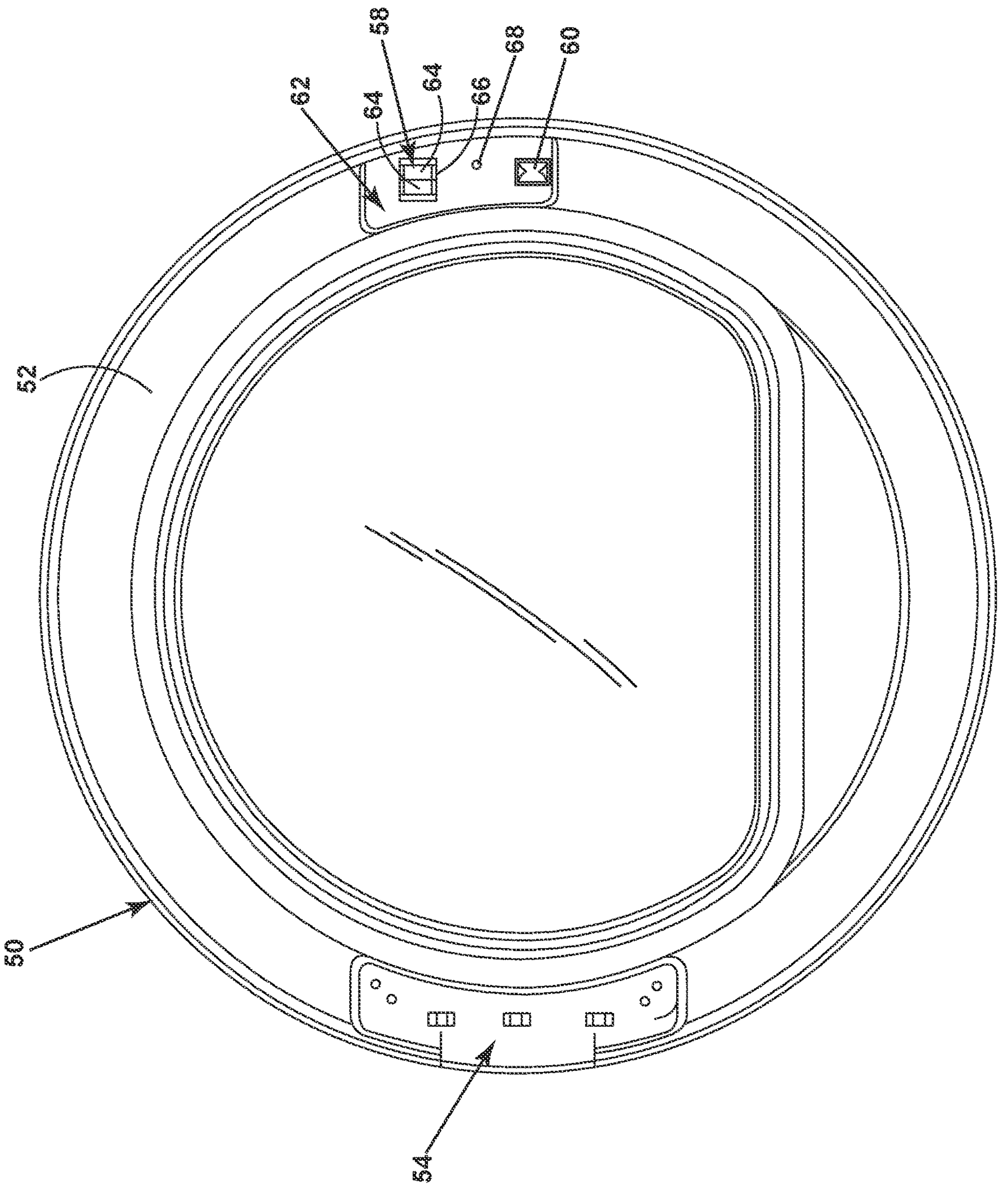
FIG. 3 illustrates the door assembly of FIG. 1 having a catch mechanism and lock projection in accordance with various aspects described herein.

Turning to FIG. 3, the door assembly 50 is shown in further detail. A unitary body 62 can be coupled to the door frame 52 as shown. The unitary body 62 can include at least one of a metallic material, a polymeric material, or a composite material. Some non-limiting examples of materials include polycarbonate, acrylonitrile butadiene styrene, polyamide, polystyrene, high impact polystyrene, polypropylene, or the like, or combinations thereof.

The lock projection 60 can be unitarily formed or made integral with the unitary body 62. In addition, the unitary body 62 can at least partially form the catch mechanism 58. In some examples, the catch mechanism 58 can include a movable cam. In the example shown, two movable cams 64 are provided and configured to surround and retain the latch 24 (FIG. 2). Any number of cams 64 can be provided. In some examples, the cams 64 can be spring-biased to a predetermined position for retaining the latch 24. In some examples, the cams 64 can be located within the door frame 52.

Figure 4:
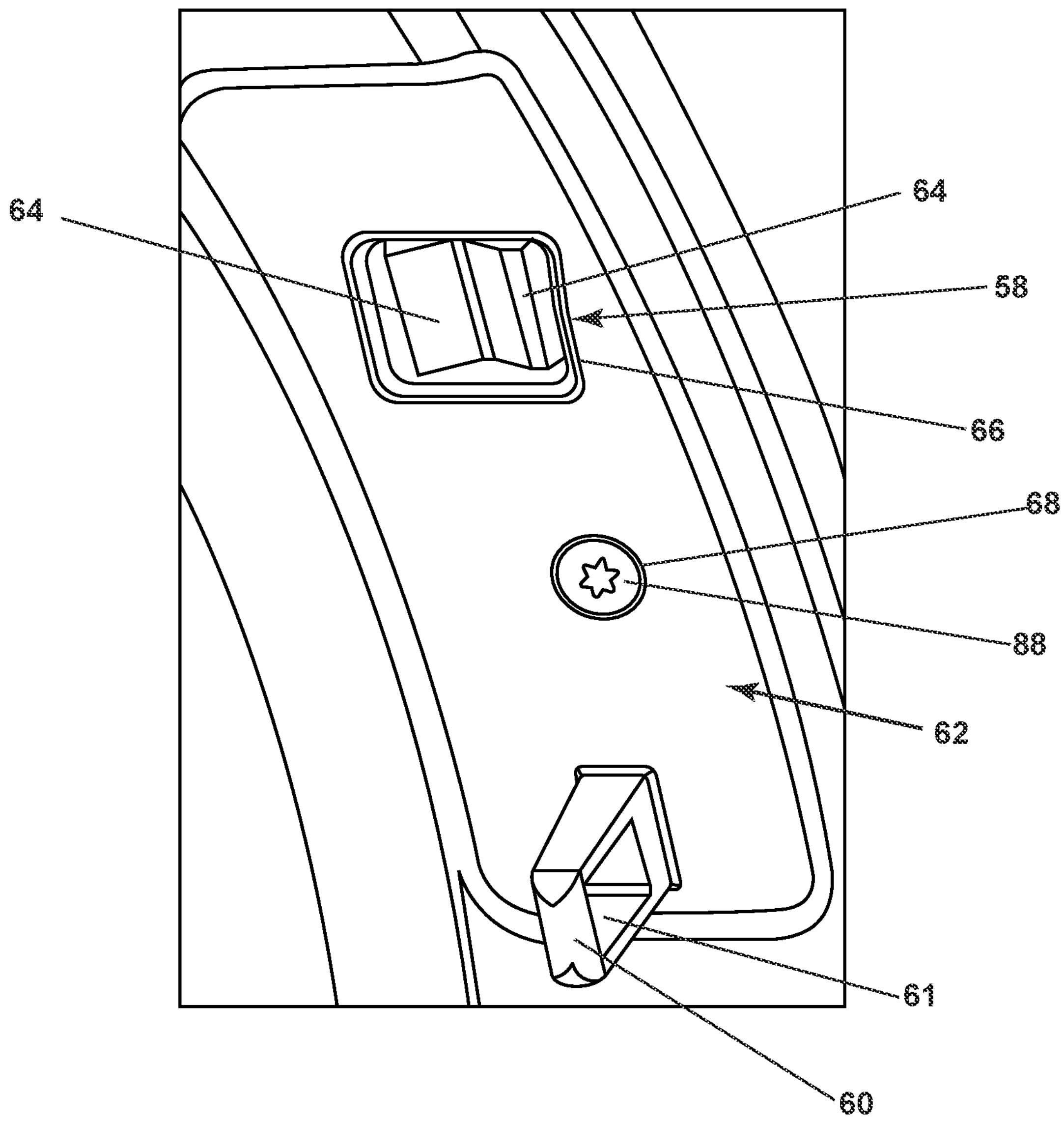
FIG. 4 illustrates a portion of the door assembly of FIG. 3.

FIG. 4 illustrates a portion of the door assembly 50 with the unitary body 62. The lock projection 60 can be part of the unitary body 62 and project from the unitary body 62 as shown. In some examples, the lock projection 60 can include a square-shaped projection or a rectangular-shaped projection. In some examples, the lock projection 60 can include a lock aperture 61 through the lock projection 60. Such a lock aperture 61 can be configured to receive the locking member 26 within the cabinet 12 (FIG. 2).

The unitary body 62 can also include an aperture 66. The aperture 66 can overlie the cams 64 of the catch mechanism 58. In this manner, the unitary body 62 can at least partially form the catch mechanism 58. In some examples, the cams 64 can be flush or coplanar with the door frame 52 such that the cams 64 do not extend beyond the aperture 66. In some examples, the cams 64 can extend beyond the aperture 66.

A second aperture 68 can also be provided in the unitary body 62. The second aperture 68 can be configured to receive a fastener, such as bolts, screws, or the like, for at least partially securing the unitary body 62 to the door frame 52.

Figure 5:
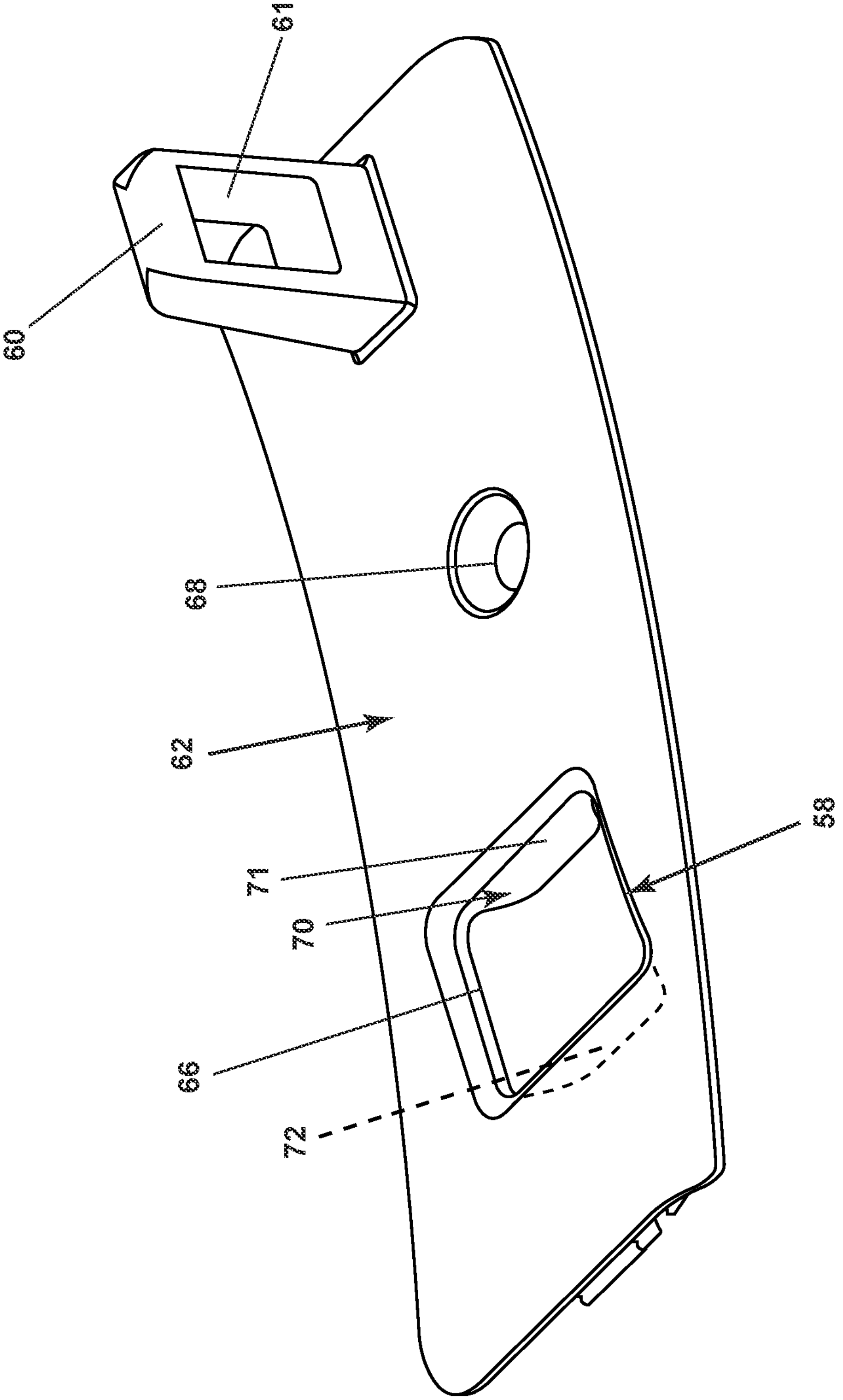
FIG. 5 illustrates a unitary body that can be utilized in the door assembly of FIG. 1.

FIG. 5 illustrates a perspective view of the unitary body 62 with the aperture 66 and lock projection 60. The unitary body 62 can further include a retaining feature 70 configured to engage the cams 64 of the catch mechanism 58 (FIG. 4). The retaining feature 70 can be located adjacent the aperture 66. In some examples, the retaining feature 70 can include a projecting tab adjacent the aperture 66. In some examples, the retaining feature 70 includes a first projecting tab 71 and a second projecting tab 72. The first and second projecting tabs 71, 72 can be provided on opposing sides of the aperture 66. In some examples, the first projecting tab 71 can be closer to the lock projection 60 compared to the second projecting tab 72. The first and second projecting tabs 71, 72 can constrain rotation or prevent undesirable or excess lateral motion of corresponding movable cams 64 of the catch mechanism 58 (FIG. 4) during operation. Any number of retaining features 70 can be provided. The retaining feature 70 can include any number of projecting tabs, including only one, or three or more. In addition, while illustrated with projecting tabs the retaining feature 70 can include other structures including, but not limited to, a collar, bevel, lip, flange, or the like, or combinations thereof.

Figure 6:
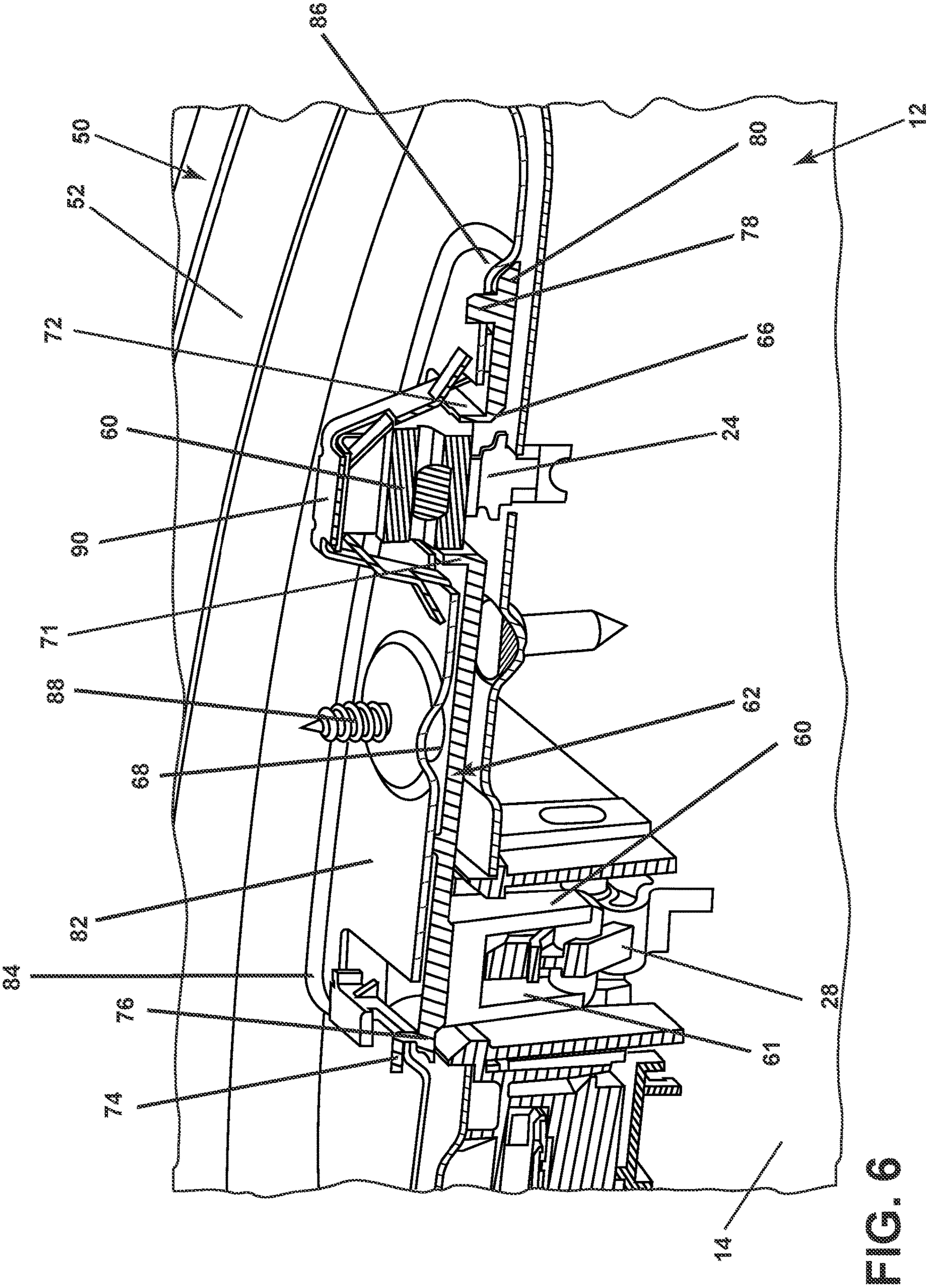
FIG. 6 illustrates a cross-sectional view of the door assembly of FIG. 1 in a closed position.

FIG. 6 is a cross-sectional view of the cabinet 12 and door assembly 50 with unitary body 62, catch mechanism 58, and lock projection 60. The door assembly 50 is illustrated in a closed position. Portions of the cabinet 12 are removed for clarity.

In some examples, at least one mounting tab can be provided with the unitary body 62. In the illustrated example, a first mounting tab 74 is provided at a first end 76 of the unitary body 62, and a second mounting tab 78 is provided at a second end 80 of the unitary body 62. Any number of mounting tabs can be provided. Either or both of the first mounting tab 74 or second mounting tab 78 can at least partially secure the unitary body 62 to the door frame 52.

The door frame 52 can also include a recess 82 configured to receive the unitary body 62. In some examples, the first and second mounting tabs 74, 78 can be configured to engage portions of the recess 82 to at least partially secure the unitary body 62 to the door frame 52. The first mounting tab 74 can be configured to engage a first portion 84 of the recess 82. The second mounting tab 78 can be configured to engage a second portion 86 of the recess 82.

A fastener 88 is also shown within the second aperture 68. The fastener 88 can at least partially secure the unitary body 62 to the door assembly 50. In some examples, both the fastener 88 and first and second mounting tabs 74, 78 can be provided for securing the unitary body 62 to the door frame 52. In some examples, the unitary body 62 can include just one mounting tab, or one or more mounting tabs without the second aperture. In some examples, the unitary body 62 can include the second aperture without any mounting tabs.

A biasing mechanism can also be provided for biasing the catch mechanism 58. In the example shown, a spring clip 90 can be coupled to the door frame 52 and engage the cams 64. Any number of spring clips 90 can be provided. In some examples, the spring clip 90 can be coupled to the door frame 52 and not engage the unitary body 62. In some examples, the spring clip 90 can be coupled to or engage both the door frame 52 and unitary body 62.

In some examples, the locking member 26 can include a movable arm 28. In some examples, the locking member 26 can include a motor configured to controllably operate the movable arm 28. The movable arm 28 can be configured to engage or disengage the lock projection 60 of the unitary body 62. In some examples, the movable arm 28 can be controllably operated to rotate into engagement with the lock projection 60, including rotating into the lock aperture 61. In some examples, the movable arm 28 can be controllably operated to slide or laterally extend into engagement with the lock projection 60, including sliding or laterally extending into the lock aperture 61.

When the door frame 52 is in the closed position as in the illustrated example, the latch 24 can extend through the aperture 66 of the unitary body 62 and be retained by the catch mechanism 58. In some examples, the latch 24 can be releasably retained by the cams 64 and spring clip 90. In addition, when the door frame 52 is in the closed position, the locking member 26 can be configured to retain the lock projection 60 for locking the door assembly 50. In some examples, the locking member 26 can include the movable arm 28 configured to engage the lock projection 60 through the lock aperture 61 for locking the door assembly 50.

Aspects of the disclosure provide for a unitary, one-piece component or panel incorporating both a releasable closure and door lock for an appliance door assembly. The aperture through the unitary body described herein can at least partially define the closure, such as the catch mechanism. Optionally, the aperture can also engage other portions of the catch mechanism such as the movable cams to provide improved performance and reliability for the catch mechanism during operation. In addition, the unitary body having the lock projection provides for a reduction in parts, part cost, complexity, and assembly time compared to traditional door assemblies utilizing separately-located closures and door lock components. The use of a door frame recess accommodating the unitary body can provide for a flush mounting of the closure and door lock, providing for a smooth surface along the door frame.

To the extent not already described, the different features and structures of the various embodiments can be used in combination with each other as desired, or can be used separately. That one feature may not be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A door assembly for an appliance, comprising:

a door frame configured to mount to a cabinet of the appliance and movable between an open position and a closed position;

a catch mechanism within the door frame and configured to receive a latch projecting from the cabinet when the door frame is in the closed position; and a unitary body coupled to the door frame and comprising a lock projection projecting from the unitary body and an aperture at least partially forming the catch mechanism.

2. The door assembly of claim 1, further comprising a retaining feature located adjacent the aperture and configured to engage the catch mechanism.

3. The door assembly of claim 2, wherein the catch mechanism comprises a movable cam, and the retaining feature comprises a projecting tab configured to constrain rotation of the movable cam.

4. The door assembly of claim 1, wherein when the door frame is in the closed position, the catch mechanism is configured to retain the latch and the lock projection is configured to be retained by a locking member within the cabinet.

5. The door assembly of claim 1, wherein the lock projection comprises one of a square-shaped projection or a rectangular-shaped projection.

6. The door assembly of claim 1, further comprising a recess in a surface of the door frame configured to receive the unitary body.

7. The door assembly of claim 6, further comprising a mounting tab located at a first end of the unitary body and configured to engage a first portion of the recess to at least partially secure the unitary body to the door frame.

8. The door assembly of claim 7, further comprising a second mounting tab located at a second end of the unitary body and configured to engage a second portion of the recess to at least partially secure the unitary body to the door frame.

9. The door assembly of claim 6, further comprising a second aperture in the unitary body configured to receive a fastener for at least partially securing the unitary body to the door frame.

10. The door assembly of claim 1, wherein the unitary body comprises at least one of a metallic material, a polymeric material, or a composite material.

11. A household appliance, comprising:

a cabinet defining an interior;

a drum located within the interior and at least partially defining a treating chamber for receiving an article for treatment;

a latch coupled to the cabinet and projecting therefrom;

a locking member coupled to the cabinet; and a door assembly coupled to the cabinet to selectively open and close the treating chamber, the door assembly comprising:

a door frame pivotally mounted to the cabinet and movable between an open position and a closed position;

a catch mechanism within the door frame and configured to receive the latch when the door frame is in the closed position; and a unitary body coupled to the door frame and comprising a lock projection projecting from the unitary body and an aperture at least partially forming the catch mechanism;

wherein the latch is configured to extend through the aperture of the unitary body and be retained by the catch mechanism when the door frame is in the closed position; and wherein the locking member is configured to retain the lock projection for locking the door assembly when the door frame is in the closed position.

12. The household appliance of claim 11, further comprising a retaining feature located adjacent the aperture and configured to engage the catch mechanism.

13. The household appliance of claim 12, wherein the catch mechanism comprises a movable cam, and the retaining feature comprises a projecting tab configured to constrain rotation of the movable cam.

14. The household appliance of claim 11, wherein the lock projection comprises one of a square-shaped projection or a rectangular-shaped projection.

15. The household appliance of claim 14, wherein the locking member comprises a movable arm configured to engage or disengage the lock projection of the unitary body.

16. The household appliance of claim 11, further comprising a recess in a surface of the door frame configured to receive the unitary body.

17. The household appliance of claim 16, further comprising a tab located at an end of the unitary body configured to engage a portion of the recess to at least partially secure the unitary body to the door frame.

18. The household appliance of claim 17, further comprising a second aperture in the unitary body configured to receive a fastener for at least partially securing the unitary body to the door frame.

19. The household appliance of claim 11, wherein the unitary body comprises at least one of a metallic material, a polymeric material, or a composite material.

20. A household appliance, comprising:

a cabinet defining an interior;

a latch coupled to the cabinet and projecting therefrom;

a locking member coupled to the cabinet; and a door assembly coupled to the cabinet to selectively provide access to the interior, the door assembly comprising:

a door frame pivotally mounted to the cabinet and movable between an open position and a closed position;

a catch mechanism within the door frame and configured to receive the latch when the door frame is in the closed position; and a unitary body coupled to the door frame and comprising a lock projection projecting from the unitary body and an aperture at least partially forming the catch mechanism;

wherein the latch is configured to extend through the aperture of the unitary body and be retained by the catch mechanism when the door frame is in the closed position; and wherein the locking member is configured to retain the lock projection for locking the door assembly when the door frame is in the closed position.

* * * * *